United States Patent [19]

Schultz et al.

[11] Patent Number: 4,796,794

[45] Date of Patent: Jan. 10, 1989

[54] COLLECTION DEVICE FOR A RIVET GUN

[75] Inventors: Duane M. Schultz, Lansing, Ill.; Gerald J. Wetle, Earl Park, Ind.

[73] Assignee: Illinois Tool Works, Inc., Chicago, Ill.

[21] Appl. No.: 61,689

[22] Filed: Jun. 12, 1987

[51] Int. Cl.[4] .............................................. B21J 15/10
[52] U.S. Cl. ................................................ 227/156
[58] Field of Search ............................. 227/156, 112

[56] References Cited

U.S. PATENT DOCUMENTS

| | | | |
|---|---|---|---|
| 4,131,009 | 12/1978 | Hara et al. ............................. | 72/391 |
| 4,178,669 | 12/1979 | Hara et al. ............................. | 29/412 |
| 4,186,862 | 2/1980 | Klaus ................................ | 227/156 X |
| 4,361,957 | 12/1982 | Krötz et al. ...................... | 227/156 X |
| 4,402,638 | 9/1983 | Tanaka ................................ | 411/34 |
| 4,535,925 | 8/1985 | Ramey et al. .................... | 227/156 X |

Primary Examiner—Paul A. Bell
Attorney, Agent, or Firm—Donald J. Breh; Thomas W. Buckman

[57] ABSTRACT

A device for collecting spent mandrels ejected from an automatic plastic rivet fastening gun is disclosed. The device includes a container conforming generally to the configuration of the gun having an inlet disposed over the mandrel ejection port of the gun and an outlet for emptying the container when full.

4 Claims, 2 Drawing Sheets

COLLECTION DEVICE FOR A RIVET GUN

BACKGROUND OF THE INVENTION

This invention relates to a collection device for use with a plastic rivet automatic fastening apparatus. More particularly, the invention relates to a device attachable to the fastening apparatus for collecting spent mandrels of the rivet after fastening.

One type of plastic rivet fastener known as a pull-to-lock rivet is disclosed in U.S. Pat. No. 4,402,638. These rivets are manufactured by molding a plurality of the rivets serially joined together as a clip for insertion in an automatic fastening device such as that disclosed in U.S. Pat. Nos. 4,131,009 or 4,178,669. These automatic fastening devices are typically air powered gun-like devices that sequentially feed individual rivets from the clip and install the rivet in well known manner by pulling on the mandrel portion of the rivet to expand the rivet body after the operator has positioned the body of the rivet in a mounting hole. After insertion, the gun mechanism automatically ejects the spent mandrel from an ejection port and positions another rivet from the clip to be fastened.

Heretofore, the spent mandrels have been allowed to discharge, fall and scatter without containment other than possibly there being provided means for deflecting or directing the direction of discharge. Such installation results in spent mandrels being left scattered on the work site and the freely flying mandrels present a possible saftey hazard.

SUMMARY OF THE INVENTION

Accordingly, it is the object of the present invention to provide for a collection device for collecting spent mandrels upon ejection from the fastening gun of the type described.

According to the invention, there is provided a container adapted to be fastened to the rivet gun at the mandrel ejection port.

According to an important feature of the invention, the container includes an inlet opening mounted over the ejection port and a chute which connects its inlet to the collection container.

Advantageously, the chute is configured to conform to the shape of the rivet gun.

A still further important feature of the invention provides for a removable cap over an outlet from the container providing for removal of the spent mandrels collected.

A further feature provides for the device to be configured as a one-piece molded elongated member having the inlet chute vertically above the container portion with the outlet disposed at the bottom of the container in its normal position when installed on the fastening device.

Another feature provides for mounting tab means at the inlet of the collection device for receipt in a corresponding slot in the fastening gun to retain the inlet over the gun ejection port.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
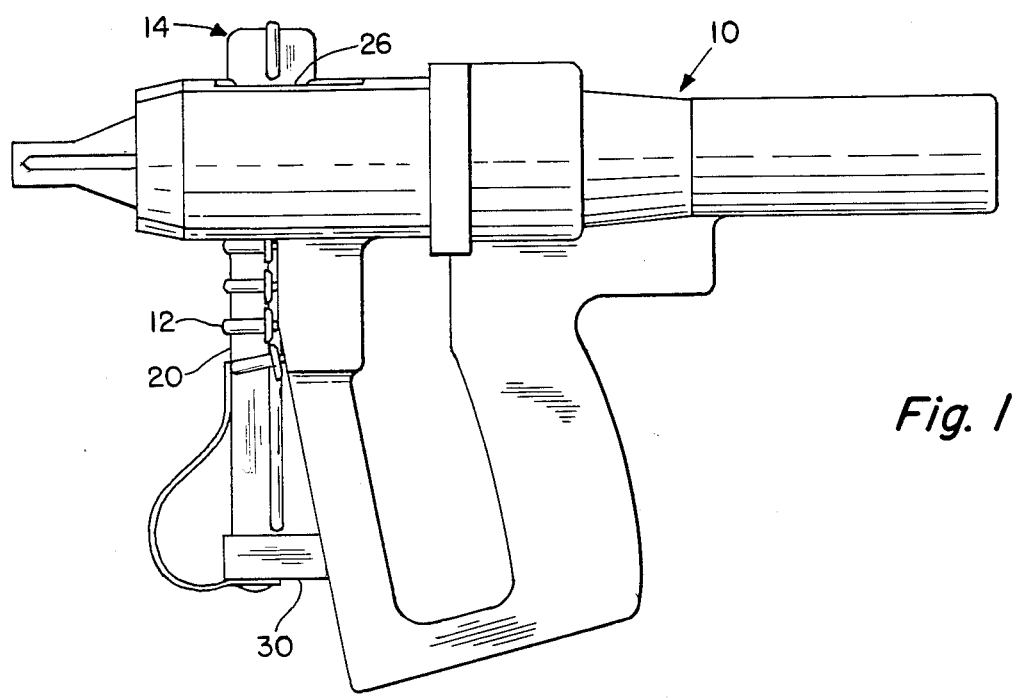
FIG. 1 is a side view of the plastic rivet automatic fastening device of the type for use with the present invention showing the collection device of the invention installed.
Figure 2:
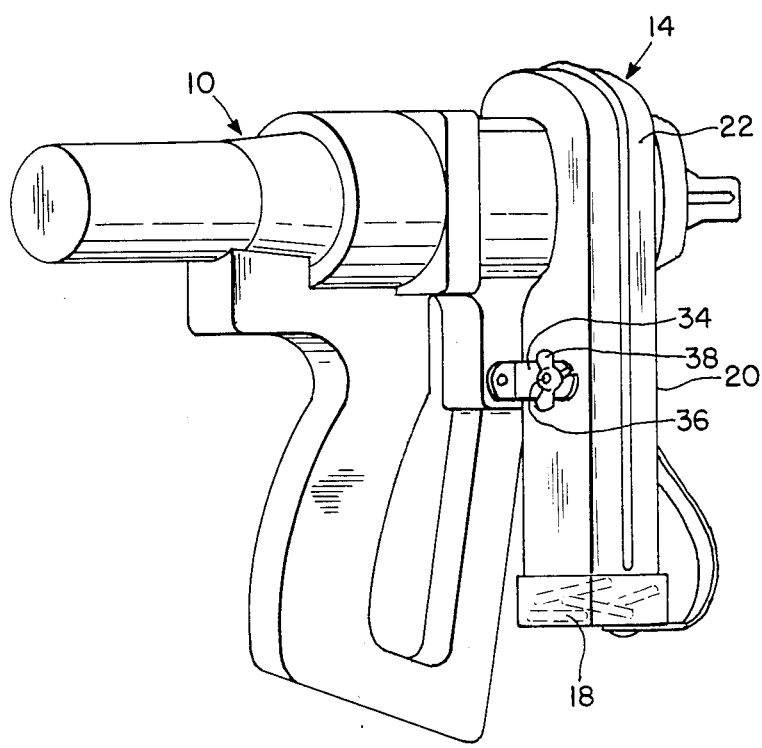
FIG. 2 is a pictorial view of the fastening device of FIG. 1 showing details of the collection device installed.
Figure 3:
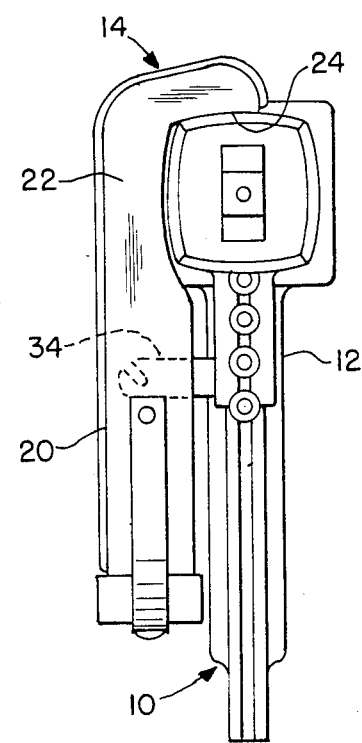
FIG. 3 is a rear end view of the fastening device of FIG. 1 showing further details of the collection device of the invention installed.
Figure 4:
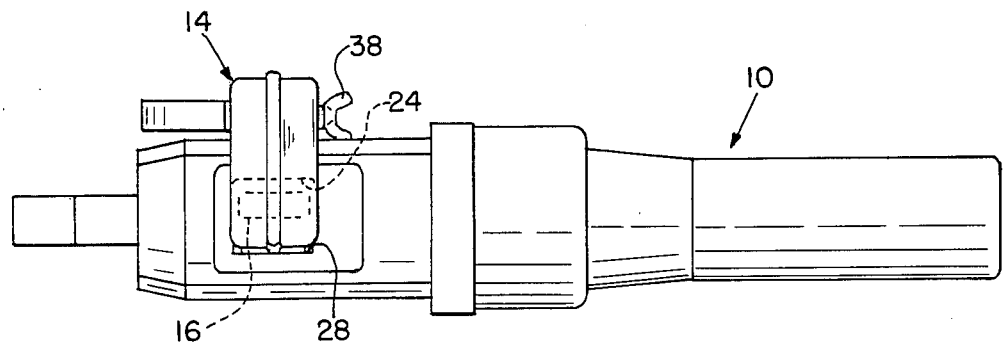
FIG. 4 is a top view of the fastening device of FIG. 1 showing the collection device of the invention installed.

Shown in FIGS. 1, 2 and 3 is an automatic fastening apparatus 10 of the type for fastening pull-to-lock type plastic rivets 12 and to which the collection device 14 of this invention described below is applicable. It is to be understood that the fastening apparatus 10 does not form part of the present invention. Nor is the invention to be considered limited to the specific configuration of the fastening device shown in the drawings. Rather the fastening device 10 shown is representative of the type of device to which the invention is applicable and it is contemplated that those skilled in the art can readily apply the collection device 14 to other automatic fastening apparatus wherein the mandrels of the fastener are ejected from a port, outlet or chamber of the apparatus.

Figure 5:
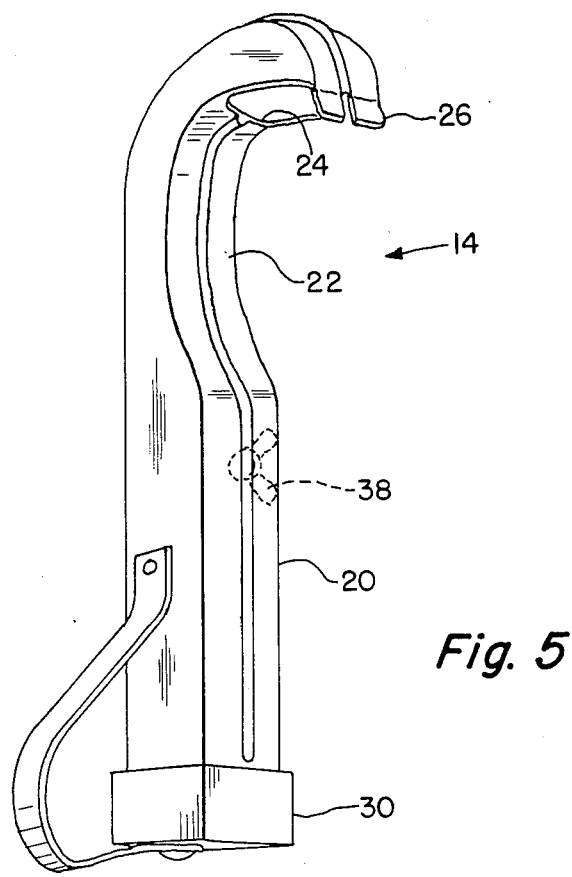
FIG. 5 is a pictorial view of the collection device according to the invention showing details of construction.

The fastening apparatus 10 is provided with a mandrel discharge or ejection port 16 from which the spent rivet mandrels 18 are ejected successively. A mandrel collection device 14 is attached to the gun and is shown in detail in FIG. 5. The collection device 14 is preferably a one-piece molded member including an elongated container portion 20 of generally square cross section. The container 20 need not be square but can be any cross section desired to hold the appropriate size and number of mandrels desired.

The container portion 20 is preceded by a generally inverted J-shaped chute portion 22 which defines a shape conforming generally to the shape of the exterior surface of the gun at the location at which the collection device is attached. The width and cross sectional shape of the chute 22 is sized to provide free passage of the spent mandrels through the chute and into the container 20. The chute 22 is provided with an inlet 24 configured to be disposed over the ejection port 16 of the gun. The chute 22 is also provided with at least one tab 26 along one edge of the inlet which is received in a slot 28 in the gun adjacent the ejection port 16 and serves to locate, position and retain the inlet over the ejection port.

The container 20 is open on one end and is provided with a removable cover 30 over the outlet for removing the collected spent mandrels 18. The device is removably mounted to the gun by way of a detachable mounting including a bracket 34 affixed to the gun and a threaded stud 36 and fastener 38 on the container. Other mounting arrangements are, of course, also possible and may vary depending on the particular gun configuration. The collection device 14 is particularly suited for retrofitting to existing guns as well as new guns since little modification of the device or gun is required to adapt the device to existing guns.

Having described the preferred embodiment of the invention, those skilled in the art having the benefit of that description can readily devise other embodiments and modifications and those other embodiments and modifications are to be considered to be within the scope of the appended claims.

What is claimed is:

1. A device for collecting spent mandrels ejected from a rivet gun, comprising a hollow one-piece member including an elongated container portion having an outlet and a chute portion defining a surface generally conforming to the shape of a portion of the external surface of the gun, said chute portion having an inlet configured to be disposed over a spent mandrel ejection port of the gun when mounted to the gun, said chute portion opening into said container portion, a cover removably mounted to said container over said outlet, and means for mounting said one-piece member to the rivet gun.

2. A device adapted for collecting spent mandrels ejected from a rivet gun, the rivet gun having a spent mandrel ejection port at a predetermined location and the rivet gun having a predetermined exterior surface shape at the predetermined location, said device comprising an elongated generally J-shaped hollow one-piece molded member including a container portion having an outlet at one end and a chute portion having an exterior surface shape substantially conforming to the predetermined exterior surface shape of the rivet gun at said location, said chute having an inlet configured to be disposed over a spent mandrel ejection port of the rivet gun, said chute opening into said container portion, a cover removeably mounted to said container portion over said outlet and means for removably mounting said one-piece member to the rivet gun.

3. The device as defined in claim 2 further including retention means for retaining said inlet over the ejection port.

4. The device as defined in claim 3 wherein said retention means includes a tab on said container proximate said inlet adapted to be received in a slot provided in the rivet gun proximate the ejection port.

* * * * *